United States Patent
Panchagnula et al.

(10) Patent No.: US 11,470,299 B2
(45) Date of Patent: Oct. 11, 2022

(54) METHODS AND APPARATUS FOR ENCODING FRAMES CAPTURED USING FISH-EYE LENSES

(71) Applicant: Nevermind Capital LLC, Wilmington, DE (US)

(72) Inventors: Ramesh Panchagnula, Irvine, CA (US); Alan Moss, Laguna Beach, CA (US)

(73) Assignee: Nevermind Capital LLC, Wilmington, DE (US)

( * ) Notice: Subject to any disclaimer, the term of this patent is extended or adjusted under 35 U.S.C. 154(b) by 0 days.

(21) Appl. No.: 17/032,554

(22) Filed: Sep. 25, 2020

(65) Prior Publication Data
US 2021/0099686 A1 Apr. 1, 2021

Related U.S. Application Data

(60) Provisional application No. 62/906,719, filed on Sep. 27, 2019.

(51) Int. Cl.
*H04N 13/161* (2018.01)
*H04N 13/194* (2018.01)
*H04N 13/00* (2018.01)

(52) U.S. Cl.
CPC ......... *H04N 13/161* (2018.05); *H04N 13/194* (2018.05); *H04N 2013/0081* (2013.01)

(58) Field of Classification Search
CPC ............... H04N 13/161; H04N 13/194; H04N 2013/0081
See application file for complete search history.

(56) References Cited

U.S. PATENT DOCUMENTS

| | | | | |
|---|---|---|---|---|
| 2008/0198920 | A1* | 8/2008 | Yang | H04N 19/149 375/240.01 |
| 2013/0182904 | A1* | 7/2013 | Zhang | A61B 5/1073 382/103 |
| 2013/0321581 | A1* | 12/2013 | El-Ghoroury | G02B 13/0085 348/46 |
| 2014/0118494 | A1* | 5/2014 | Wu | G06T 7/55 348/44 |
| 2014/0321561 | A1 | 10/2014 | Stec | |
| 2015/0092856 | A1 | 4/2015 | Mammou | |
| 2017/0127046 | A1* | 5/2017 | Das | H04N 13/204 |
| 2019/0068993 | A1 | 2/2019 | Aflaki Beni | |
| 2019/0208114 | A1* | 7/2019 | Ginat | H04N 19/167 |

* cited by examiner

*Primary Examiner* — Nasim N Nirjhar
(74) *Attorney, Agent, or Firm* — Blank Rome LLP

(57) ABSTRACT

A method and system for encoding a stereoscopic image pair is disclosed. Groups of pixels are analyzed to determine the depth of each pixel group. The number of bits per pixel used to encode each pixel group is selected based on the depth of that pixel group. Therefore, images of objects closer to the camera pair, which appear closer to the viewer, are encoded with a larger number of bits per pixel than objects perceived to be farther from the viewer. The number of bits per pixel may also be increased based on a number of objects depicted or motion detected. The size of prediction blocks used to encode image portions may also be determined based on an angular distance of an image portion relative to the center of the frame. Therefore, smaller prediction blocks may be used to encode image portions closer to the center of the frame.

18 Claims, 12 Drawing Sheets

METHODS AND APPARATUS FOR ENCODING FRAMES CAPTURED USING FISH-EYE LENSES

FIELD

The present disclosure relates to methods and apparatus for encoding images captured using fish-eye lenses, e.g., left and right frames of a stereoscopic image pair.

BACKGROUND

Limitations on communications bandwidth often require various decisions to be made with regard to how to encode images to be transmitted to a playback device. Encoding decisions can have a significant impact on the perceived quality of images output by a playback device due to degradation associated with the quality of images associated with lossy encoding.

Various factors may affect the perceived quality, including the number of bits allocated to represent each pixel, the size of prediction blocks used to encode image portions, etc.

In the case of stereoscopic images, loss in image quality can result in a decrease in the sense of depth and/or other problems. The importance of preserving details, which will allow differences in left and right images to be perceived as an accurate indication of depth, is often complicated by the fact that images of a stereoscopic pair are sometimes captured with fish-eye lenses, which introduce more distortions into one portion of an image than other portions of an image.

In view of the above, there is a need for improved methods of processing and/or encoding images of a stereoscopic pair. In particular, it would be appreciated if methods and/or apparatus could be developed which would facilitate the setting of one or more encoding parameters or settings in a way that a desired data rate could be achieved while taking into consideration the potential effect on the images that are to be used by a stereoscopic playback device.

SUMMARY

Methods and apparatus for capturing, encoding and transmitting stereoscopic images are described. In various embodiments left and right images, also sometimes referred to as left and right eye images, are captured by a pair of stereoscopic cameras which include fish-eye lenses.

In accordance with various features of this disclosure, in one or more embodiments, the depth to which pixels of an image correspond is determined and taken into consideration when deciding how many bits to use to represent a portion of an image or images of stereoscopic pair. In some embodiments, pixels are determined to correspond to one of a number of predetermined depth levels. Those predetermined depth levels are then used to determine the number of bits to use to represent a particular pixel or set of pixels, e.g., a block of pixels.

In at least some such embodiments, blocks of pixels corresponding to different depths are represented by the encoder using different numbers of bits per pixel. The user of a playback device in some embodiments is assumed to view the scene captured by the stereoscopic camera pair from the position in the environment where the camera pair is located. In some embodiments, fewer bits per pixel are used to represent pixels determined to correspond to a depth that is further from the camera pair than pixels determined to correspond to a second depth that is closer to the camera pair. Thus while fewer bits are used to represent a pixel at a greater distance from the user, the user normally expects object that are far away to be blurry and the use of fewer bits per pixel will have less of an effect on the playback experience than if fewer bits where used to represent pixels that will be perceived as being close to the viewer as indicated by less of a depth, e.g., distance, from the camera pair capturing the images.

Thus, in some embodiments, frames (e.g., left and right frames of a stereoscopic frame pair) will have pixels corresponding to different depths represented using different number of pixels. For example 12 bits may be used to represent a pixel having a short or low depth, which is perceived to be closer to the user of a playback device viewing the encoded images, and 8 bits may be and sometime is used to represent a pixel at a second further distance (e.g., depth) from the camera pair, which is perceived to be further from the user of a playback device viewing the encoded images.

While pixel depth is taken into consideration when encoding pixels, e.g., of different blocks of an image, it can also be useful to take into consideration the size and/or number of objects in a frame or frames being encoded. It can also be useful to consider the activity level associated with a frame, e.g., how much it differs from a preceding or subsequent frame or frames. This information is useful since the number and size of objects may affect the number of edges in an image which may be desirable to preserve. Meanwhile, temporal variance between frames can provide an indication of how effective the use of predictions will be and the potential for motion blur when predictive coding is used to code a sequence of frames.

In various embodiments frames are analyzed to determine the number and/or size of objects and also to generate an estimate of the variance of the frame with regard to other frames in a sequence which is sometimes considered an indication of action or activity.

In some cases, the number of bits per pixel determined to be used based on the depth to which the pixel corresponds is adjusted based on the number and/or size of objects represented by the pixels in the frame and/or the activity of the frame or temporal variance. The number of bits per pixel can be and sometime is adjusted up or down based one, more or all of these factors. Thus, for example, in areas where a large number of objects are located, the number of bits per pixel might be and sometime is increased to preserve edges. In other cases, where a single object is present, the bits per pixel might be decreased since there are few edges and the surfaces of the object maybe located at a single depth. Similarly, adjustments to the number of bits per pixel maybe made based on the level of activity, e.g., variation between the current frame being processed and/or one or more frames corresponding to a preceding or subsequent time period.

The number of bits per pixel may also be adjusted based on which portion of a fish-eye lens captured the pixel. Because of the distorting nature of a fish-eye lens, pixels corresponding to the outer portion of a circular fish-eye lens tend to be more distorted than portion near the center of the fish eye lens. In some embodiments, the bits per pixel is adjusted so that portions of a scene captured by an outer portion of a fish-eye lens are represented by more bits per pixel than pixels which correspond to the center portion of the fish-eye lens. Thus, in some embodiments, a pixel corresponding to light that passed through an outer portion of a fish-eye lens may be represented using more bits than a pixel corresponding to light that passed through a center portion of the fish-eye lens, even though both pixels correspond to the same depth.

The number of bits per pixel to be used for an individual pixel block, e.g., rectangular set of pixels, of a left and/or right frame of a stereoscopic frame pair is communicated to an encoder used to encode the frames of the frame pair. Different portions, e.g., sets of blocks corresponding to a frame, may be represented using different numbers of bits per individual pixel, e.g., because the portions correspond to different depths and/or because the different portions where captured using different portions of a fish-eye lens or lenses.

In addition to making a bits per pixel encoding determination, in some embodiments the block size to be used for predictions for a portion of a frame, entire frame, or frame pair is determined. In some cases, the block size is based on the portion of the fish-eye lens used to capture the image or images being encoded and/or the angular position in a 3D environment to which the image portion being encoded corresponds.

As with the number of bits per pixel, the block size used for predictions for a portion of a frame or frame pair may also be determined in part by the size and/or number of objects in a frame and/or the variance within a frame in the case of intra-frame predictions or the variance between frames in the case where motion vectors are being generated and motion compensated predications are being made by the encoder and/or playback device.

Thus, in various embodiments, the encoding decisions and/or encoder settings take into consideration one or more factors that will affect how the user perceives the stereoscopic images generated by displaying frame pairs at playback time and the potential effect on the user's ability to perceive the depth of objects and/or edges of the objects.

Numerous additional features and embodiments will be discussed in the detailed description which follows.

DETAILED DESCRIPTION

Figure 1:
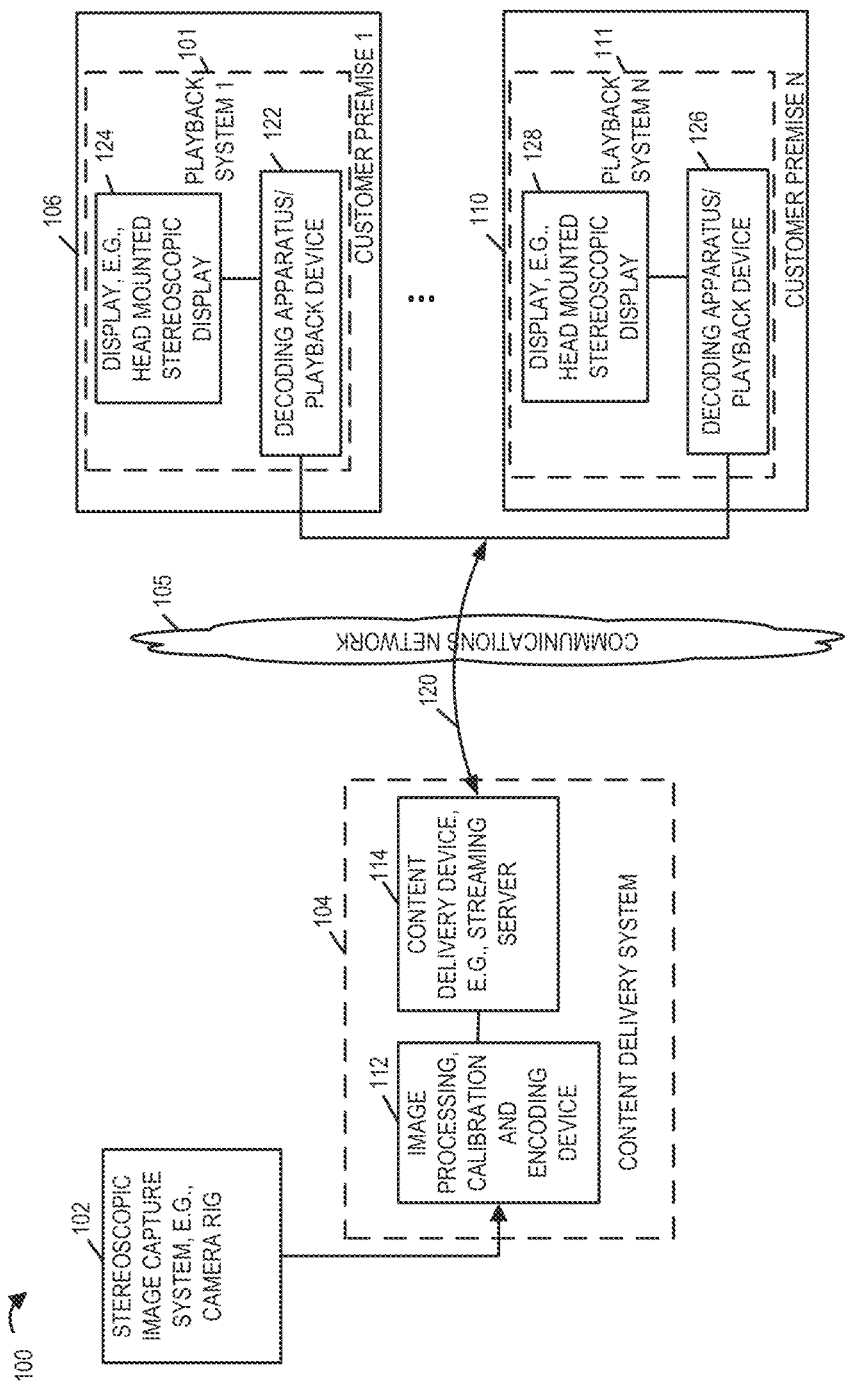
FIG. 1 illustrates an exemplary system, implemented in accordance with some embodiments of this disclosure, which can be used to capture, stream content, and output content to one or more users.

FIG. 1 illustrates an exemplary system 100 implemented in accordance with some embodiments of this disclosure. The system 100 supports content delivery, e.g., imaging content delivery, to one or more customer devices, e.g., playback devices/content players, located at customer premises. The system 100 includes the exemplary image capturing device 102, a content delivery system 104, a communications network 105, and a plurality of customer premises 106, . . . , 110. The image capturing device 102 supports capturing of stereoscopic imagery. The image capturing device 102 captures and processes imaging content in accordance with the features of this disclosure. The communications network 105 may be, e.g., a hybrid fiber-coaxial (HFC) network, satellite network, and/or internet.

The content delivery system 104 includes an image processing, calibration and encoding apparatus 112 and a content delivery device 114, e.g. a streaming server 114. The image processing, calibration and encoding apparatus 112 is responsible for performing a variety of functions including camera calibration based on one or more target images and/or grid patterns captured during a camera calibration process, generation of a distortion correction or compensation mesh which can be used by a playback device to compensate for distortions introduced by a calibrated camera, processing, e.g., cropping and encoding of captured images, and supplying calibration and/or environmental information to the content delivery device 114, which can be supplied to a playback device and used in the rendering/image playback process. Content delivery device 114 may be implemented as a server with, as will be discussed below, the delivery device responding to requests for content with image calibration information, optional environment information, and one or more images captured by the camera rig 102, which can be used in simulating a 3D environment. Streaming of images and/or content may be a function of feedback information such as viewer head position and/or user selection of a position at the event corresponding to a camera rig 102, which is to be the source of the images. For example, a user may select or switch between images from a camera rig 102 positioned at center line to a camera rig 102 positioned at the field goal with the simulated 3D environment and streamed images being changed to those corresponding to the user selected camera rig 102. Thus, it should be appreciated that, while a single camera rig 102 is shown in FIG. 1, multiple camera rigs 102 may be present in the system 100 and located at different physical locations at a sporting or other event with the user being able to switch between the different positions and with the user selections being communicated from the playback device 122 to the content server 114. While separate devices 112, 114 are shown in the image processing and content delivery system 104, it should be appreciated that the system may be implemented as a single device including separate hardware for performing the various functions or with different functions being controlled by different software or hardware modules but being implemented in or on a single processor.

The encoding apparatus 112 may, and in some embodiments does, include one or a plurality of encoders for encoding image data in accordance with this disclosure. The encoders may be used in parallel to encode different portions of a scene and/or to encode a given portion of a scene to generate encoded versions that have different data rates. Using multiple encoders in parallel can be particularly useful when real time or near real time streaming is to be supported.

The content streaming device 114 is configured to stream, e.g., transmit, encoded content to deliver the encoded image content to one or more customer devices 101, 111, e.g., over the communications network 105. Via the network 105, the content delivery system 104 can send and/or exchange information with the devices located at the customer premises 106, 110 as represented in the figure by the link 120 traversing the communications network 105.

While the encoding apparatus 112 and content delivery server 114 are shown as separate physical devices in the FIG. 1 example, in some embodiments they are implemented as a single device which encodes and streams content. The encoding process may be a 3D, e.g., stereoscopic, image encoding process where information corresponding to left and right eye views of a scene portion are encoded and included in the encoded image data so that 3D image viewing can be supported. The particular encoding method used is not critical to the present application and a wide range of encoders may be used as or to implement the encoding apparatus 112.

Each customer premise 106, 110 may include a plurality of playback systems, e.g., devices/players, e.g., apparatus that can decode and playback/display the imaging content streamed by the content streaming device 114. Customer premise 1 106 includes a playback system 101 that includes a decoding apparatus/playback device 122 coupled to a display device 124. Customer premise N 110 includes a playback system 111 including a decoding apparatus/playback device 126 coupled to a display device 128. In some embodiments the display devices 124, 128 are head mounted stereoscopic display devices. In various embodiments the playback system 101 is a head mounted system supported by a strap that is worn around the user's head. Thus, in some embodiments, customer premise 1 106 includes playback system 1 101 which includes decoding apparatus/playback device 122 coupled to display 124, e.g., a head mounted stereoscopic display, and customer premise N 110 includes playback system N 111 which includes decoding apparatus/playback device 126 coupled to display 128, e.g., a head mounted stereoscopic display, In various embodiments decoding apparatus 122, 126 present the imaging content on the corresponding display devices 124, 128. The decoding apparatus/players 122, 126 may be devices that are capable of decoding the imaging content received from the content delivery system 104, generate imaging content using the decoded content and rendering the imaging content, e.g., 3D image content, on the display devices 124, 128. Any of the decoding apparatus/playback devices 122, 126 may be used as the decoding apparatus/playback device 800 shown in FIG. 3. A system/playback device such as the one illustrated in FIG. 3 can be used as any of the decoding apparatus/playback devices 122, 126.

Figure 2:
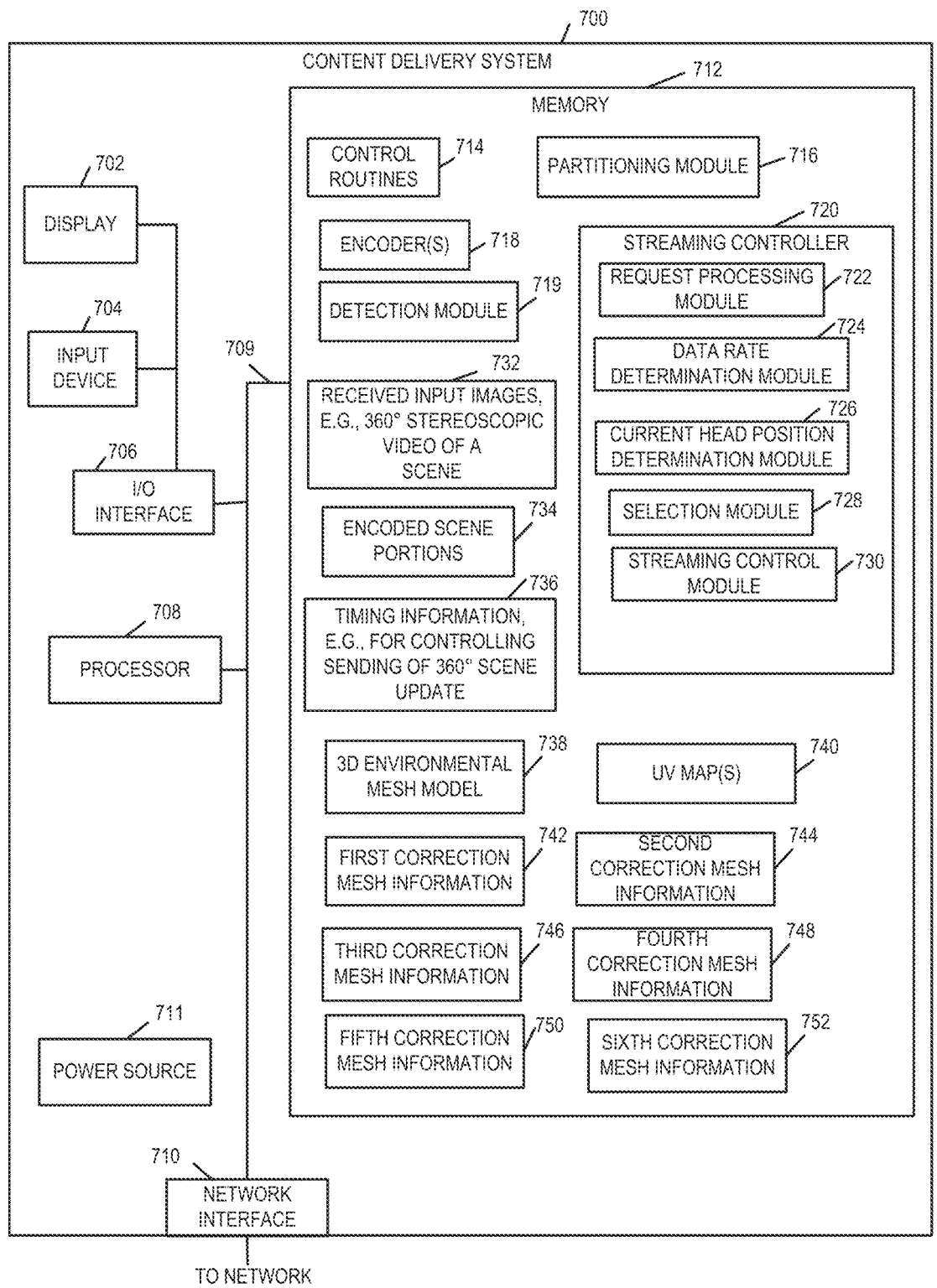
FIG. 2 illustrates an exemplary content delivery system with encoding capability that can be used to encode and stream content in accordance with the features of this disclosure.

FIG. 2 illustrates an exemplary content delivery system 700 with encoding capability that can be used to encode and stream content in accordance with the features of this disclosure.

The system may be used to perform object detection, encoding, storage, and transmission and/or content output in accordance with the features of this disclosure. The content delivery system 700 may be used as the system 104 of FIG. 1. While the system shown in FIG. 2 is used for encoding, processing and streaming of content, it should be appreciated that the system 700 may also include the ability to decode and display processed and/or encoded image data, e.g., to an operator.

The system 700 includes a display 702, input device 704, input/output (I/O) interface 706, a processor 708, network interface 710, a power source 711, and memory 712. The various components of the system 700 are coupled together via bus 709, which allows for data to be communicated between the components of the system 700.

The memory 712 includes various modules, e.g., routines, which when executed by the processor 708 control the computer system 700 to implement the immersive stereoscopic video acquisition, encoding, storage, and transmission and/or output methods in accordance with this disclosure. The memory 712 includes control routines 714, a partitioning module 716, encoder(s) 718, a detection module 719, a streaming controller 720, received input images 732, e.g., 360-degree stereoscopic video of a scene, encoded scene portions 734, timing information 736, an environmental mesh model 738, UV maps(s) 740 and a plurality of correction mesh information sets including first correction mesh information 742, second correction mesh information 744, third correction mesh information 746, fourth correction mesh information 748, fifth correction mesh information 750 and sixth correction mesh information 752. In some embodiments, the modules are implemented as software modules. In other embodiments, the modules are implemented in hardware, e.g., as individual circuits with each module being implemented as a circuit for performing the function to which the module corresponds. In still other embodiments, the modules are implemented using a combination of software and hardware.

The control routines 714 include device control routines and communications routines to control the operation of the system 700. The partitioning module 716 is configured to partition a received stereoscopic 360-degree version of a scene into N scene portions in accordance with the features of this disclosure.

The encoder(s) 718 may, and in some embodiments do, include a plurality of encoders 718 configured to encode received image content, e.g., a 360-degree version of a scene and/or one or more scene portions in accordance with the features of this disclosure. In some embodiments, the encoder(s) 718 include multiple encoders 718 with each encoder 718 being configured to encode a stereoscopic scene and/or partitioned scene portions to support a given bit rate stream. Thus, in some embodiments, each scene portion may be encoded using multiple encoders 718 to support multiple different bit rate streams for each scene. An output of the encoder(s) 718 is the encoded scene portions 734, which are stored in the memory 712 for streaming to customer devices, e.g., playback devices. The encoded content 734 can be streamed to one or multiple different devices via the network interface 710.

The detection module 719 is configured to detect a network-controlled switch from streaming content from a current camera pair, e.g., first stereoscopic camera pair, to another camera pair, e.g., a second or third stereoscopic camera pair. That is the detection module 719 detects if the system 700 has switched from streaming content stream generated using images captured by a given stereoscopic camera pair, e.g., a first stereoscopic camera pair, to streaming content stream generated using images captured by another camera pair. In some embodiments, the detection module is further configured to detect a user controlled change from receiving a first content stream including content from the first stereoscopic camera pair 102 to receiving a second content stream including content from the second stereoscopic camera pair 102, e.g., detecting a signal from user playback device indicating that the playback device is attached to a different content stream than a content to which it was attached previously.

The streaming controller 720 is configured to control streaming of encoded content and delivering the encoded image content to one or more customer devices, e.g., over the communications network 105. The streaming controller 720 includes a request processing module 722, a data rate determination module 724, a current head position determination module 726, a selection module 728, and a streaming control module 730. The request processing module 722 is configured to process a received request for imaging content from a customer playback device. The request for content is received in various embodiments via a receiver in the network interface 710. In some embodiments, the request for content includes information indicating the identity of requesting playback device. In some embodiments, the request for content may include a data rate supported by the customer playback device, a current head position of the user, e.g., position of the head mounted display. The request processing module 722 processes the received request and provides retrieved information to other elements of the streaming controller 720 to take further actions. While the request for content may include data rate information and current head position information, in various embodiments the data rate supported by the playback device may be determined from network tests and other network information exchange between the system 700 and the playback device.

The data rate determination module 724 is configured to determine the available data rates that can be used to stream imaging content to customer devices. For example, since multiple encoded scene portions are supported, the content delivery system 700 can support streaming content at multiple data rates to the customer device. The data rate determination module 724 is further configured to determine the data rate supported by a playback device requesting content from system 700. In some embodiments, the data rate determination module 724 is configured to determine available data rate for delivery of image content based on network measurements.

The current head position determination module 726 is configured to determine a current viewing angle and/or a current head position of the user, e.g., position of the head mounted display, from information received from the playback device. In some embodiments, the playback device periodically sends current head position information to the system 700 where the current head position determination module 726 receives and processes the information to determine the current viewing angle and/or a current head position.

The selection module 728 is configured to determine which portions of a 360-degree scene to stream to a playback device based on the current viewing angle/head position information of the user. The selection module 728 is further configured to select the encoded versions of the determined scene portions based on available data rate to support streaming of content.

The streaming control module 730 is configured to control streaming of image content, e.g., multiple portions of a 360-degree stereoscopic scene, at various supported data rates in accordance with the features of this disclosure. In some embodiments, the streaming control module 730 is configured to control stream N portions of a 360-degree stereoscopic scene to the playback device requesting content to initialize scene memory in the playback device. In various embodiments, the streaming control module 730 is configured to send the selected encoded versions of the determined scene portions periodically, e.g., at a determined rate. In various embodiments, the streaming control module 730 is configured to communicate at least a sufficient number of the N portions to the playback device on a periodic basis to allow the playback device to fully refresh a 360-degree version of said scene at least once during each refresh period. In some embodiments, the streaming control module 730 is further configured to send a 360-degree scene update to the playback device in accordance with a time interval, e.g., once every minute. In some embodiments, sending a 360-degree scene update includes sending N scene portions or N-X scene portions of the full 360-degree stereoscopic scene, where N is the total number of portions into which the full 360-degree stereoscopic scene has been partitioned and X represents the selected scene portions recently sent to the playback device. In some embodiments, the streaming control module 730 waits for a predetermined time after initially sending N scene portions for initialization before sending the 360-degree scene update. In some embodiments, the timing information to control sending of the 360-degree scene update is included in the timing information 736. In some embodiments the streaming control module 730 is further configured identify scene portions that have not been transmitted to the playback device during a refresh interval and transmit an updated version of the identified scene portions that were not transmitted to the playback device during the refresh interval.

Figure 4:
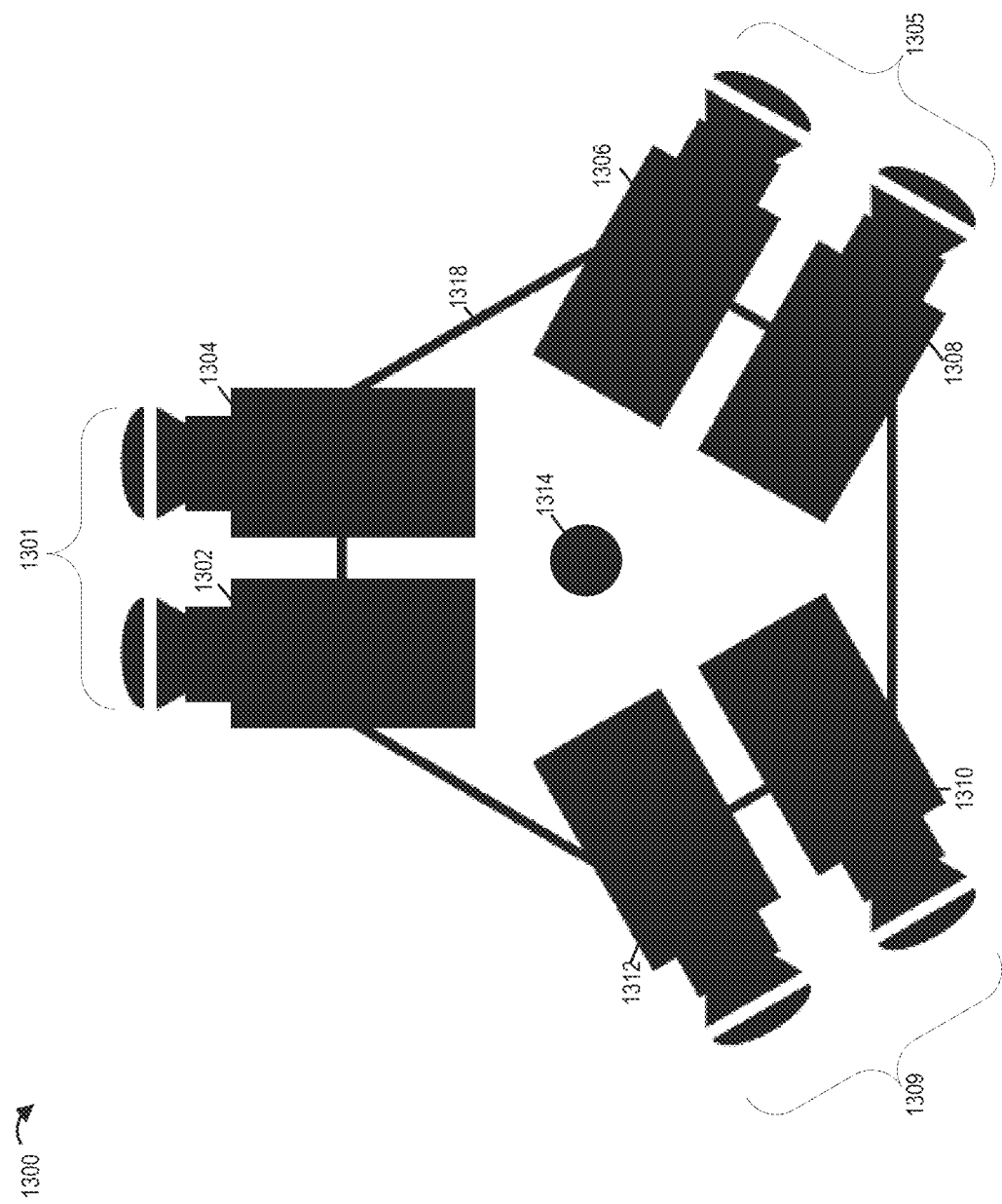
FIG. 4 illustrates a camera rig including multiple camera pairs for capturing left and right eye images corresponding to different 120-degree sectors of a 360-degree field of view along with a camera or cameras directed towards the sky to capture a sky view.

In some embodiments streaming controller 720 is configured to control the system 700 to transmit, e.g., via a transmitter in the network interface 710, a stereoscopic content stream (e.g., encoded content stream 734) including encoded images generated from image content captured by one or more cameras, e.g., cameras of stereoscopic camera pairs such as illustrated in FIG. 4. In some embodiments streaming controller 720 is configured to control the system 700 to transmit, to one or more playback devices, an environmental mesh model 738 to be used in rendering image content. In some embodiments streaming controller 720 is further configured to transmit to a playback device a first UV map to be used for mapping portions of images captured by a first stereoscopic camera pair to a portion of the environmental mesh model as part of a image rendering operation.

In various embodiments the streaming controller 720 is further configured to provide (e.g., transmit via a transmitter in the network interface 710) one or more sets of correction mesh information, e.g., first, second, third, fourth, fifth, sixth, correction mesh information to a playback device. In some embodiments, the first correction mesh information 742 is for use in rendering image content captured by a first camera of a first stereoscopic camera pair, the second correction mesh information 744 is for use in rendering image content captured by a second camera of the first stereoscopic camera pair, the third correction mesh information 746 is for use in rendering image content captured by a first camera of a second stereoscopic camera pair, the fourth correction mesh information 748 is for use in rendering image content captured by a second camera of the second stereoscopic camera pair, the fifth correction mesh information 750 is for use in rendering image content captured by a first camera of a third stereoscopic camera pair, the sixth correction mesh information 752 is for use in rendering image content captured by a second camera of the third stereoscopic camera pair. In some embodiments the streaming controller 720 is further configured to indicate, e.g., by sending a control signal, to the playback device that the third and fourth correction mesh information 746 and 748 should be used when content captured by the second stereoscopic camera pair is streamed to the playback device instead of content from the first stereoscopic camera pair. In some embodiments, the streaming controller 720 is further configured to indicate to the playback device that the third and fourth correction mesh information 746 and 748 should be used in response to the detection module 719 detecting i) a network controlled switch from streaming content from said first stereoscopic camera pair to said second stereoscopic pair or ii) a user controlled change from receiving a first content stream including content from said first stereoscopic camera pair to receiving a second content stream including encoded content from the second stereoscopic camera pair.

The memory 712 further includes the environmental mesh model 738, UV map(s) 740, and sets of correction mesh information including first correction mesh information 742, second correction mesh information 744, third correction mesh information 746, fourth correction mesh information 748, fifth correction mesh information 750 and sixth correction mesh information 752, etc. The system provides the environmental mesh model 738 to one or more playback devices for use in rendering image content. The UV map(s) 740 include at least a first UV map to be used for mapping portions of images captured by the first stereoscopic camera pair to a portion of the environmental mesh model 738 as part of an image rendering operation. The first correction mesh information 742 includes information generated based on measurement of one or more optical characteristics of a first lens of said first camera of the first stereoscopic camera pair and the second correction mesh information 744 includes information generated based on measurement of one or more optical characteristic of a second lens of said second camera of the first stereoscopic camera pair. In some embodiments, the first and second stereoscopic camera pairs correspond to a forward viewing direction but different locations at an area or event location where content is being captured for streaming.

Figure 9A:
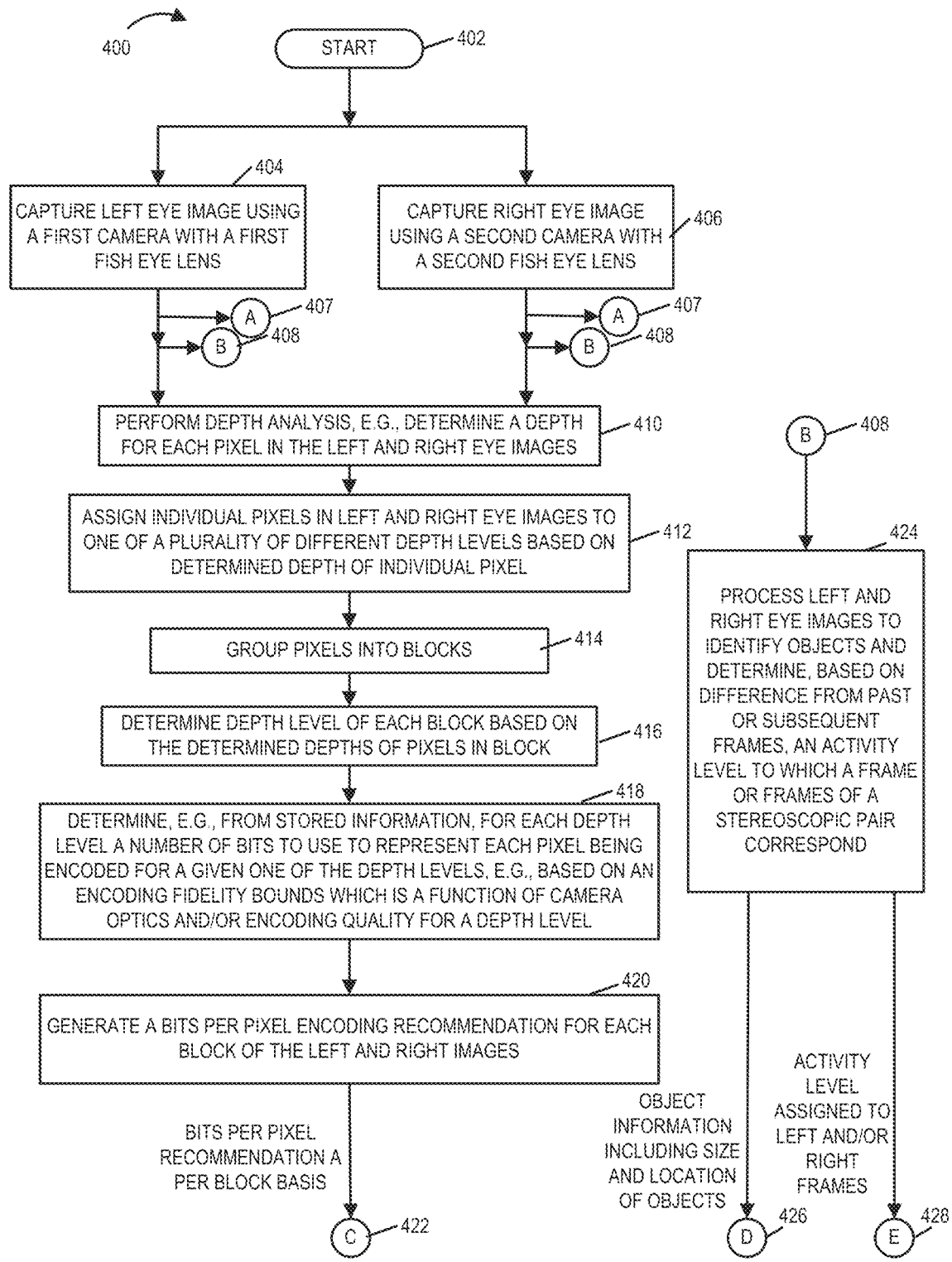
FIG. 9A shows a first part of the method shown in FIG. 9.
Figure 9B:
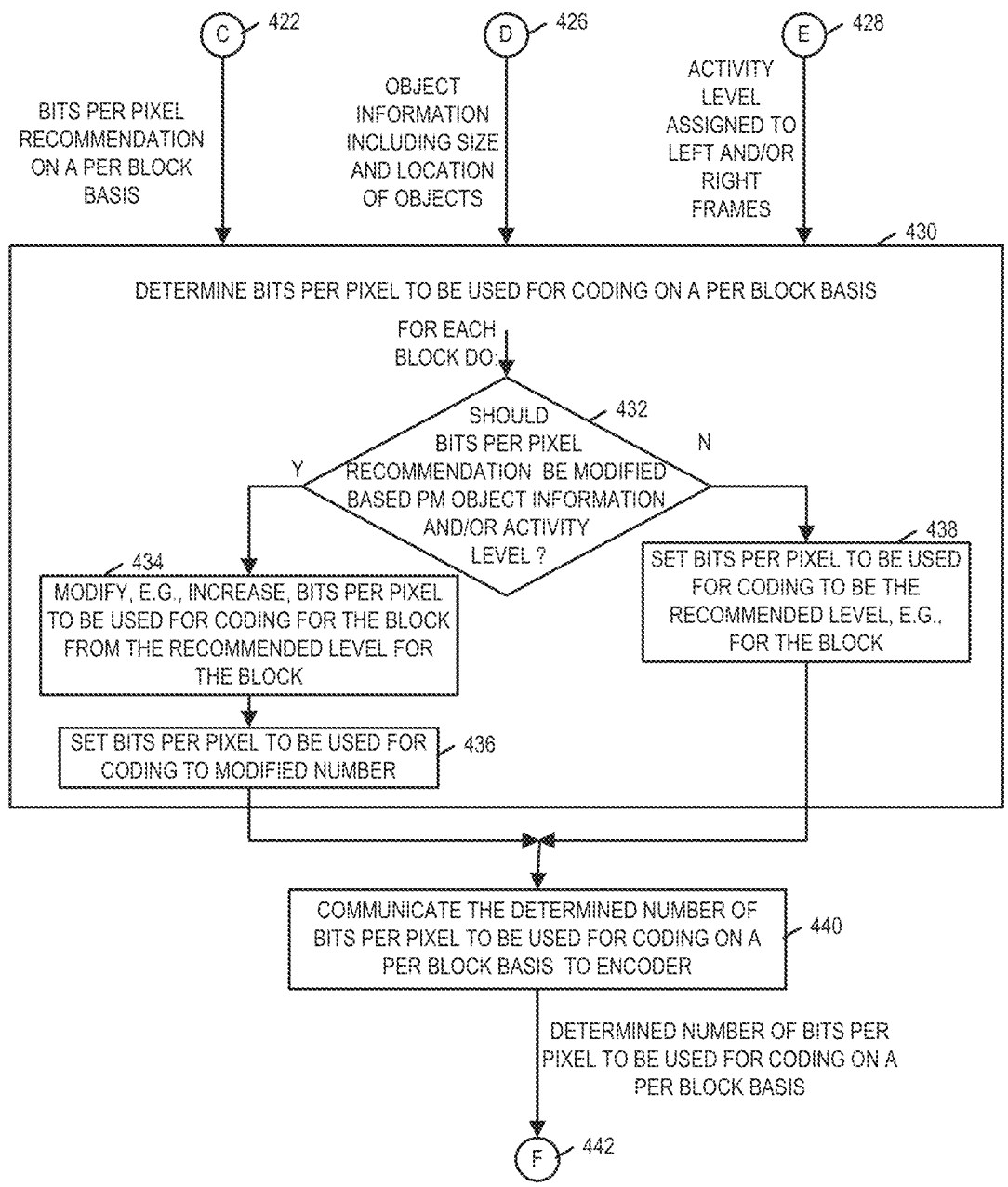
FIG. 9B shows a second part of the method shown in FIG. 9.
Figure 9C:
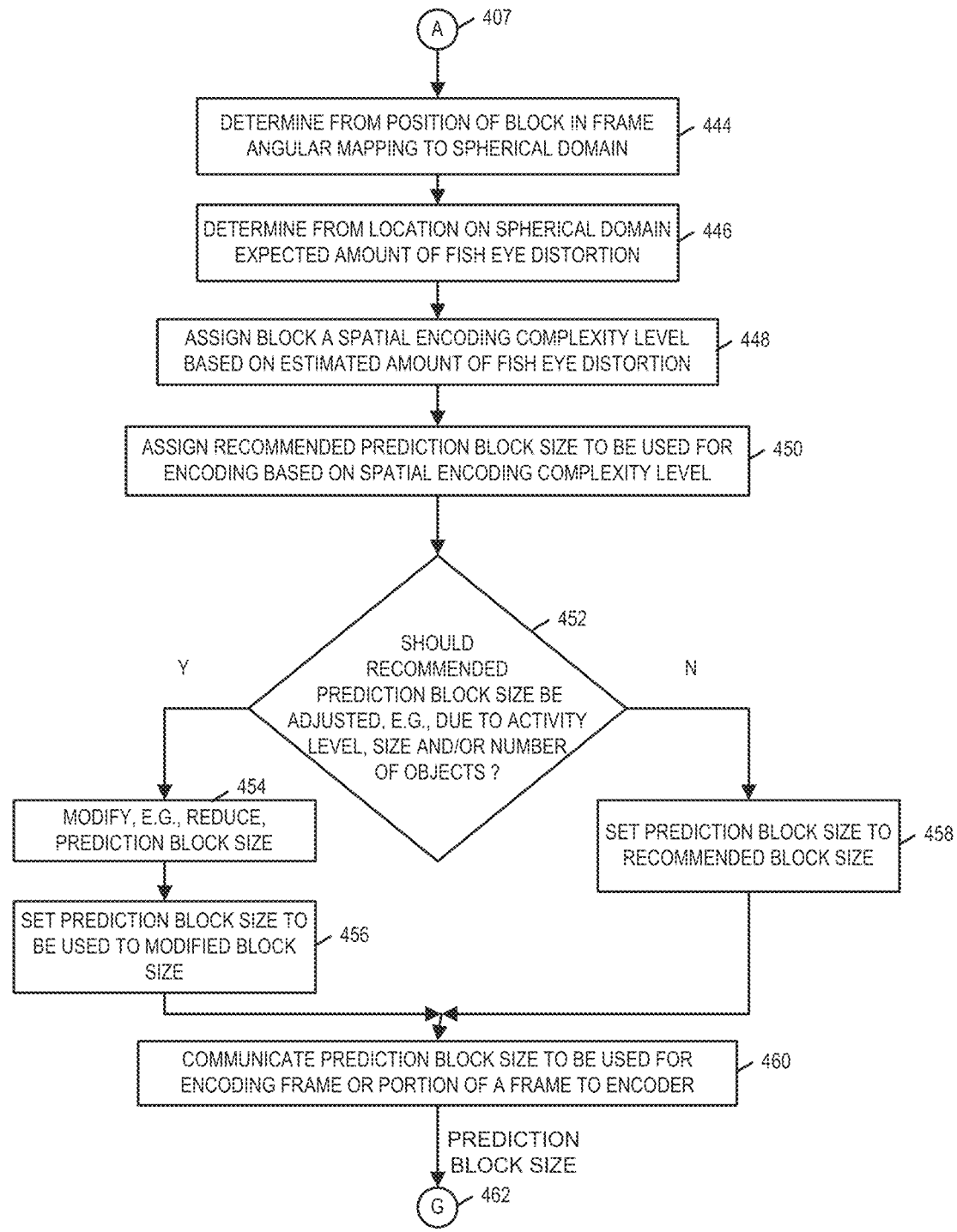
FIG. 9C shows a third part of the method shown in FIG. 9.
Figure 9D:
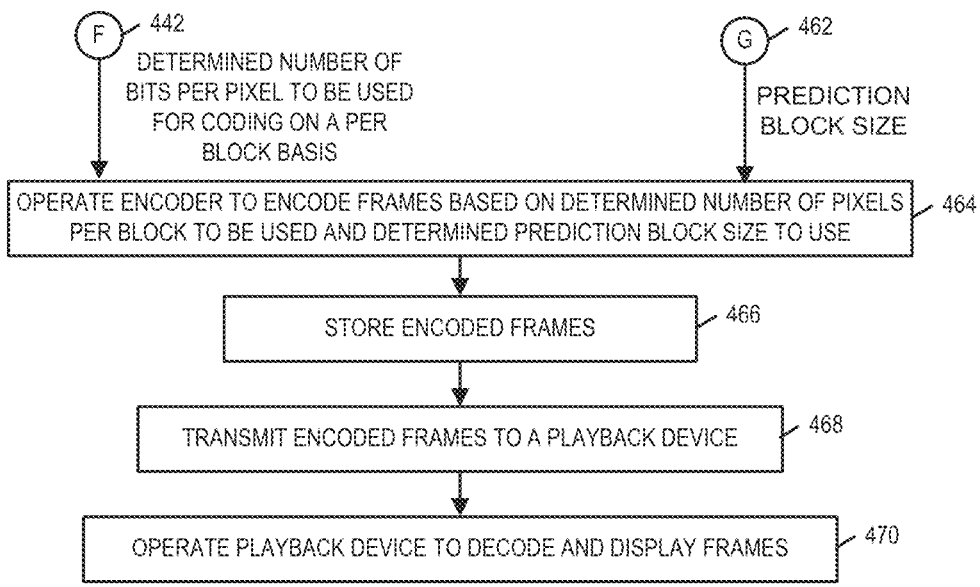
FIG. 9D shows a fourth part of the method shown in FIG. 9.
Figure 9:
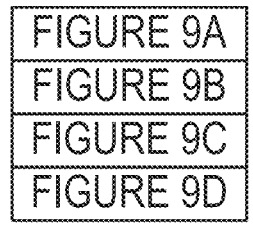
FIG. 9, which comprises the combination of FIGS. 9A, 9B, 9C and 9D, shows a method of processing, captured image content in accordance with this disclosure, which may be implemented by the content delivery system shown in FIG. 1 and/or the image processing, calibration and encoding device 112 of the content delivery system 104 shown in FIG. 1.

In some embodiments, the processor 708 is configured to perform the various functions corresponding to the steps discussed in method 400 shown in FIG. 9. In some embodiments, the processor 708 uses routines and information stored in memory 712 to perform various functions and control the system 700 to operate in accordance with the methods of the present disclosure. In some embodiments, the processor 708 is configured to control the system to provide the first correction mesh information 742 and the second correction mesh information 744 to a playback device, the first correction mesh information 742 being for use in rendering image content captured by the first camera, the second correction mesh information 744 being for use in rendering image content captured by the second camera. In some embodiments the first stereoscopic camera pair corresponds to a first direction and the processor 708 is further configured to control the system 700 to transmit a stereoscopic content stream including encoded images generated from image content captured by the first and second cameras. In some embodiments, the processor 708 is further configured to transmit to the playback device an environmental mesh model 738 to be used in rendering image content. In some embodiments, the processor 708 is further configured to transmit to the playback device a first UV map 740 to be used for mapping portions of images captured by the first stereoscopic camera pair to a portion of the environmental mesh model 738 as part of an image rendering operation. In some embodiments, the processor 708 is further configured to control the system 700 to provide third correction mesh information 746 and fourth correction mesh information 748 to the playback device, the third correction mesh information 746 being for use in rendering image content captured by a first camera of a second stereoscopic camera pair, the fourth correction mesh information 748 being for use in rendering image content captured by a second camera of the second stereoscopic camera pair. In some embodiments the processor 708 is further configured to control the system 700 to indicate (e.g., transmit via network interface 710) to the playback device that the third and fourth correction mesh information 746 and 748 should be used when content captured by the second camera pair is streamed to the playback device instead of content from the first camera pair. In some embodiments, the processor 708 is further configured to control the system 700 to indicate to the playback device that the third and fourth correction mesh information 746 and 748 should be used in response to the system detecting: i) a network controlled switch from streaming content from the first stereoscopic camera pair to the second stereoscopic pair or ii) a user controlled change from receiving a first content stream including content from the first stereoscopic camera pair to receiving a second content stream including encoded content from the second stereoscopic camera pair. In some embodiments, the processor 708 is further configured to control the system 700 to system to provide the fifth and sixth correction mesh information 750 and 752 to the playback device, the fifth correction mesh information 750 being for use in rendering image content captured by the first camera of the third stereoscopic camera pair, the sixth correction mesh information 752 being for use in rendering image content captured by the second camera of the third stereoscopic camera pair.

Figure 3:
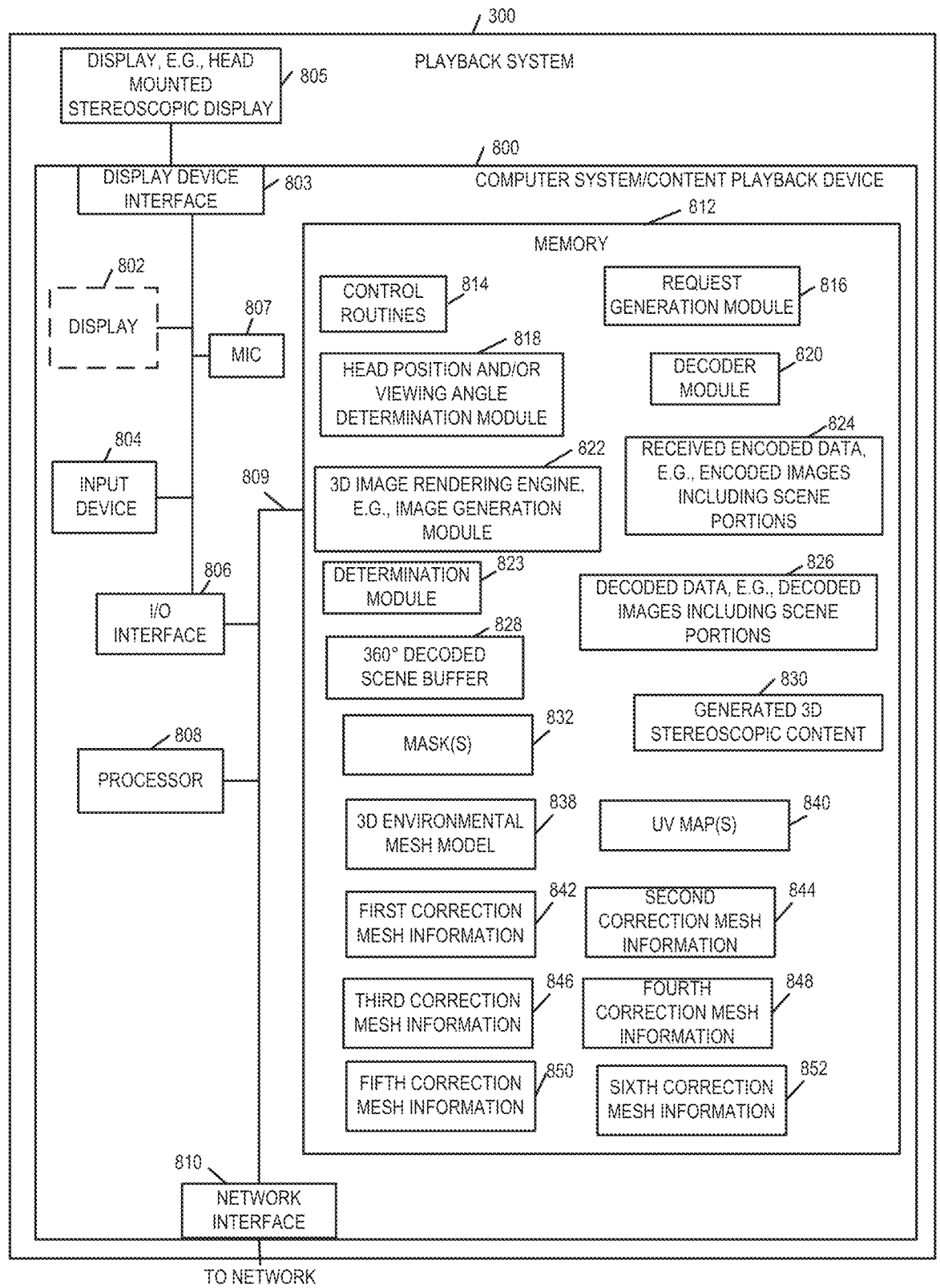
FIG. 3 illustrates an exemplary content playback system that can be used to receive, decode and display the content streamed by the system of FIG. 2.

FIG. 3 illustrates a playback system 300 implemented in accordance with an exemplary embodiment of the present disclosure. Playback system 300 is, e.g., playback system 101 or playback system 111 of FIG. 1. Exemplary playback system 300 includes computer system/playback device 800 coupled to display 805, e.g., a head mounted stereoscopic display. The computer system/playback device 800, implemented in accordance with the present disclosure, can be used to receive, decode, store and display imaging content received from a content delivery system such as the one shown in FIGS. 1 and 2. The playback device may be used with a 3D head mounted display such as the OCULUS RIFT™ VR (virtual reality) headset which may be the head mounted display 805. The device 800 includes the ability to decode the received encoded image data and generate 3D image content for display to the customer. The playback device in some embodiments is located at a customer premise location, such as a home or office, but may be located at an image capture site as well. The device 800 can perform signal reception, decoding, display and/or other operations in accordance with this disclosure.

The device 800 includes a display 802, a display device interface 803, an input device 804, a microphone (mic) 807, an input/output (I/O) interface 806, a processor 808, a network interface 810 and memory 812. The various components of the playback device 800 are coupled together via bus 809 that allows for data to be communicated between the components of the system 800. While, in some embodiments, display 802 is included as an optional element as illustrated using the dashed box, in some embodiments an external display device 805, e.g., a head mounted stereoscopic display device, can be coupled to the playback device via the display device interface 803.

Via the I/O interface 806, the system 800 can be coupled to external devices to exchange signals and/or information with other devices. In some embodiments, via the I/O interface 806, the system 800 can receive information and/or images from an external device and output information and/or images to external devices. In some embodiments, via the I/O interface 806, the system 800 can be coupled to an external controller, such as a handheld controller.

The processor 808, e.g., a central processing unit (CPU), executes routines 814 and modules in memory 812 and uses the stored information to control the system 800 to operate in accordance with this disclosure. The processor 808 is responsible for controlling the overall general operation of the system 800. In various embodiments, the processor 808 is configured to perform functions that have been discussed as being performed by the playback system 800.

Via the network interface 810, the system 800 communicates and/or receives signals and/or information (e.g., including encoded images and/or video content corresponding to a scene) to/from various external devices over a communications network, e.g., such as communications network 105. In some embodiments, the system receives one or more content streams including encoded images captured by one or more different cameras via the network interface 810 from the content delivery system 700. The received content stream may be stored as received encoded data, e.g., encoded images 824. In some embodiments the interface 810 is configured to receive a first encoded image including image content captured by a first camera and a second encoded image including image content captured by a second camera. The network interface 810 includes a receiver and a transmitter via which the receiving and transmitting operations are performed. In some embodiments, the interface 810 is configured to receive correction mesh information corresponding to a plurality of different cameras including first correction mesh information 842, second correction mesh information 844, third correction mesh information 846, fourth correction mesh information 848, fifth correction mesh information 850, and sixth correction mesh information 852, which are then stored in memory 812. Furthermore, in some embodiments, via the interface 810, the system receives one or more mask(s) 832, an environmental mesh model 838, and/or UV maps(s) 840, which are then stored in memory 812.

The memory 812 includes various modules, e.g., routines, which when executed by the processor 808 to control the playback device 800 to perform decoding and output operations in accordance with this disclosure. The memory 812 includes control routines 814, a request for content generation module 816, a head position and/or viewing angle determination module 818, a decoder module 820, a stereoscopic image rendering engine 822 (also referred to as a 3D image generation module), a determination module 823, and data/information, including received encoded image content 824, decoded image content 826, a 360 degree decoded scene buffer 828, generated stereoscopic content 830, mask(s) 832, an environmental mesh model 838, UV maps(s) 840, and a plurality of received correction mesh information sets, including first correction mesh information 842, second correction mesh information 844, third correction mesh information 846, fourth correction mesh information 848, fifth correction mesh information 850 and sixth correction mesh information 852, etc.

The control routines 814 include device control routines and communications routines to control the operation of the device 800. The request generation module 816 is configured to generate a request for content to send to a content delivery system for providing content. The request for content is sent in various embodiments via the network interface 810. The head position and/or viewing angle determination module 818 is configured to determine a current viewing angle and/or a current head position of the user, e.g., position of the head mounted display, and report the determined position and/or viewing angle information to the content delivery system 700. In some embodiments, the playback device 800 periodically sends current head position information to the system 700.

The decoder module 820 is configured to decode encoded image content 824 received from the content delivery system 700 to produce decoded image data, e.g., decoded images 826. The decoded image data 826 may include decoded stereoscopic scene and/or decoded scene portions. In some embodiments, the decoder 820 is configured to decode the first encoded image to generate a first decoded image and decode the second received encoded image to generate a second decoded image. The decoded first and second images are included in the stored decoded image images 826.

The 3D image rendering engine 822 performs the rendering operations (e.g., using content and information received and/or stored in memory 812 such as decoded images 826, environmental mesh model 838, UV map(s) 840, masks 832 and mesh correction information) and generates 3D images in accordance with the features of this disclosure for display to the user on the display 802 and/or the display device 805. The generated stereoscopic image content 830 is the output of the 3D image generation engine 822. In various embodiments, the rendering engine 822 is configured to perform a first rendering operation using the first correction information 842, the first decoded image, and the environmental mesh model 838 to generate a first image for display. In various embodiments, the rendering engine 822 is further configured to perform a second rendering operation using the second correction information 844, the second decoded image, and the environmental mesh model 838 to generate a second image for display. In some such embodiments, the rendering engine 822 is further configured to use a first UV map (included in received UV map(s) 840) to perform the first and second rendering operations. The first correction mesh information 842 provides information on corrections to be made to node positions in the first UV map when the first rendering operation is performed to compensate for distortions introduced into the first image by a lens of the first camera and the second correction mesh information 844 provides information on corrections to be made to node positions in the first UV map when the second rendering operation is performed to compensate for distortions introduced into the second image by a lens of the second camera. In some embodiments, the rendering engine 822 is further configured to use a first mask (included in mask(s) 832) to determine how portions of the first image are combined with portions of a first image corresponding to a different field of view as part of the first rendering operation when applying portions of the first image to a surface of the environmental mesh model as part of the first rendering operation. In some embodiments, the rendering engine 822 is further configured to use the first mask to determine how portions of the second image are combined with a portions of a second image corresponding to the different field of view as part of the second rendering operation when applying portions of the second image to the surface of the environmental mesh model as part of the second rendering operation. The generated stereoscopic image content 830 includes the first and second images (e.g., corresponding to left and right eye views) generated as a result of the first and second rendering operation. In some embodiments, the portions of a first image corresponding to a different field of view correspond to a sky or ground field of view. In some embodiments, the first image is a left eye image corresponding to a forward field of view and the first image corresponding to a different field of view is a left eye image captured by a third camera corresponding to a side field of view adjacent the forward field of view. In some embodiments, the second image is a right eye image corresponding to a forward field of view and the second image corresponding to a different field of view is a right eye image captured by a fourth camera corresponding to a side field of view adjacent the forward field of view. Thus, the rendering engine 822 renders the 3D image content 830 to the display. In some embodiments, the operator of the playback device 800 may control one or more parameters via the input device 804 and/or select operations to be performed, e.g., select to display a 3D scene.

The network interface 810 allows the playback device to receive content from the streaming device 114 and/or communicate information such as view head position and/or position (camera rig) selection indicating selection of particular viewing position at an event. In some embodiments, the decoder 820 is implemented as a module. In such embodiments, executed the decoder module 820 causes received images to be decoded while 3D image rendering engine 822 causes further processing of the images in accordance with the present disclosure and, optionally, stitching images together as part of the presentation process.

In some embodiments, the interface 810 is further configured to receive additional mesh correction information corresponding to a plurality of different cameras, e.g., third, fourth, fifth and sixth mesh correction information. In some embodiments the rendering engine 822 is further configured to use mesh correction information corresponding to a fourth camera (e.g., fourth mesh correction information 848) when rendering an image corresponding to a fourth camera, the fourth camera being one of the plurality of different cameras. The determination module 823 is configured to determine which mesh correction information is to be used by the rendering engine 822 when performing a rendering operation based on which camera captured image content is being used in the rendering operation or based an indication from a server indicating which mesh correction information should be used when rendering images corresponding to a received content stream. The determination module 823 may be implemented as part of the rendering engine 822 in some embodiments.

In some embodiments, the modules and/or elements shown in the memory 712 of FIG. 2 and memory 812 of FIG. 3 are implemented as software modules. In other embodiments, the modules and/or elements, while shown to be included in the memory, are implemented in hardware, e.g., as individual circuits with each element being implemented as a circuit for performing the function corresponding to the element. In still other embodiments, the modules and/or elements are implemented using a combination of software and hardware.

While shown in FIGS. 2 and 3 to be included in the memory, the elements shown included in the system 700 and 800 can, and in some embodiments are, implemented fully in hardware within the processor, e.g., as individual circuits, of the corresponding device, e.g., within the processor 708 in case of the content delivery system and within the processor 808 in the case of playback system 800. In other embodiments, some of the elements are implemented, e.g., as circuits, within the corresponding processors 708 and 808 with other elements being implemented, e.g., as circuits, external to and coupled to the processors. As should be appreciated, the level of integration of modules on the processor 708 or 808 and/or with some modules being external to the processor 708 or 808 may be one of design choice. Alternatively, rather than being implemented as circuits, all or some of the elements may be implemented in software and stored in the memory 712 or 812, with the software modules controlling operation of the respective systems 700 and 800 to implement the functions corresponding to the modules when the modules are executed by their respective processors, e.g., processors 708 and 808. In still other embodiments, various elements are implemented as a combination of hardware and software, e.g., with a circuit external to the processor providing input to the processor which then under software control operates to perform a portion of a module's function.

While the embodiments in each of FIGS. 2 and 3 are shown as including a single processor 708 or 808, e.g., computer, it should be appreciated that each of the processors 708 and 808 may be implemented as one or more processors, e.g., computers. When one or more elements in the memory 712 and 812 are implemented as software modules, the modules include code, which when executed by the processor of the corresponding system (e.g., processor 708 and 808) configure the processor to implement the function corresponding to the module. In embodiments where the various modules shown in FIGS. 2 and 3 are stored in memory, the memory is a computer program product comprising a computer readable medium comprising code, e.g., individual code for each module, for causing at least one computer, e.g., processor, to implement the functions to which the modules correspond.

Completely hardware-based or completely software-based modules may be used. However, it should be appreciated that any combination of software and hardware, e.g., circuit implemented modules may be used to implement the functions. As should be appreciated, the modules illustrated in FIG. 2 control and/or configure the system 700 or elements therein such as the processor 708, to perform the functions of corresponding steps of the methods of the present disclosure, e.g., such as those illustrated and/or described in the flowcharts. Similarly, the modules illustrated in FIG. 3 control and/or configure the system 800 or elements therein such as the processor 808, to perform the functions of corresponding steps of the methods of the present disclosure, e.g., such as those illustrated and/or described in a flowchart.

To facilitate an understanding of the image capture process, reference will now be made to the exemplary camera rig shown in FIG. 4. The camera rig 1300 can be used as the rig 102 of the FIG. 1 system and includes a plurality of stereoscopic camera pairs (e.g., three stereoscopic camera pairs) each capturing images of a different one of a plurality of sectors (e.g., three sectors). The first stereoscopic camera pair 1301 includes a left eye camera 1302 (e.g., first camera) and a right camera 1304 (e.g., second camera) intended to capture images corresponding to those which would be seen by a left and right eye of a person positioned at the location of the first camera pair 1301. Second stereoscopic camera pair 1305 captures images of a second sector and includes left and right cameras 1306, 1308 while the third stereoscopic camera pair 1309 captures images of a third sector includes left and right cameras 1310, 1312. Each camera is mounted in a fixed position in the support structure 1318. An upward facing camera 1314 is also included. A downward facing camera, which is not visible in FIG. 4, may be included below camera 1314. Stereoscopic camera pairs are used in some embodiments to capture pairs of upward and downward images. However, in other embodiments, a single upward camera and a single downward camera are used. In still other embodiments, a downward image is captured prior to rig placement and used as a still ground image for the duration of an event. Such an approach tends to be satisfactory for many applications given that the ground view tends not to change significantly during an event. The output of the cameras of the rig 1300 are captured and processed.

When the camera rig 1300 of FIG. 4 is used, each of the sectors corresponds to a known 120-degree viewing area with respect to the position of the camera rig 1300, with the captured images from different sector pairs being stiched together based on the mapping of the images to the simulated 3D environment. While a 120-degree portion of each image captured by a sector camera is normally used, the cameras capture a wider image corresponding to approximately a 180-degree viewing area. Accordingly, captured images may be subject to masking in the playback device as part of the 3D environmental simulation.

Figure 5:
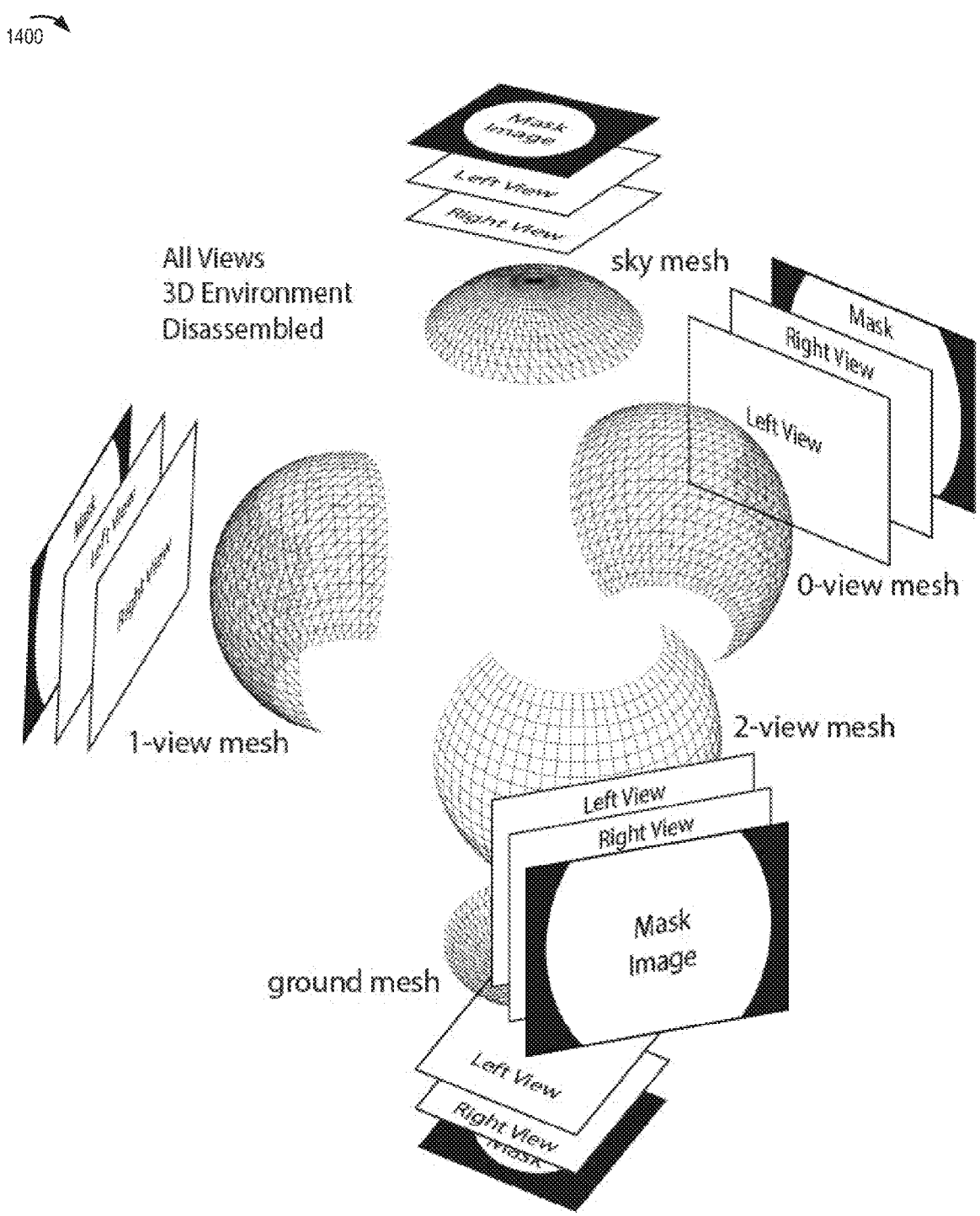
FIG. 5 shows how 5 different environmental mesh maps, corresponding to different camera views, can be combined to create a complete spherical view/environment onto which background images can be applied as part of a playback operation.

FIG. 5 is a composite diagram 1400 showing how a 3D spherical environment can be simulated using environmental mesh portions which correspond to different camera pairs of the rig 102. Note that one mesh portion is shown for each of the sectors of the rig 102 with a sky mesh being used with regard to the top camera view and the ground mesh being used for the ground image captured by the downward facing camera. While the masks for the top and bottom images are round in nature, the masks applied to the sector images are truncated to reflect that top and bottom portions of the scene area will be supplied by the top and bottom cameras respectively.

Figure 6:
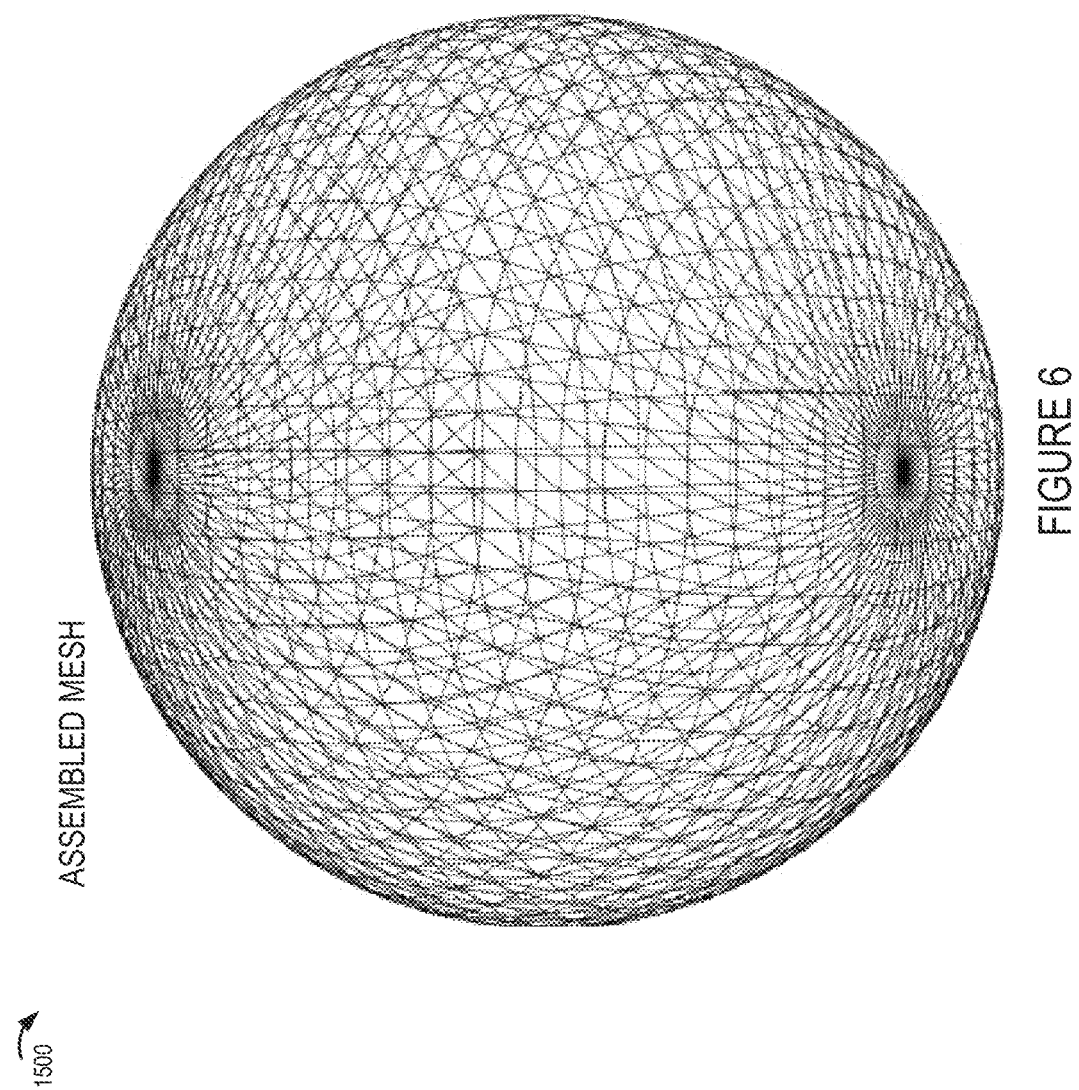
FIG. 6 shows the full assembly of 5 meshes to create a spherical simulated environment

When combined, the overall meshes corresponding to different cameras results in an assembled spherical mesh as shown in FIG. 6. Note that the mesh is shown for a single eye image but that it is used for both the left and right eye images in the case of stereoscopic image pairs being captured.

Mesh and masking information of the type shown in FIG. 5 may be communicated to the playback device. The communicated information will vary depending on the configuration of the rig 102. For example, if a larger number of sectors are used, masks corresponding to each of the sectors would correspond to a viewing area smaller than 120 degrees with more than 3 environmental grids being required to cover the diameter of the sphere.

Environmental map information is shown being optionally transmitted in step 1132 to the playback device. It should be appreciated that the environmental map information is optional and, in the event such information is not communicated, the environment may be assumed to be a default size sphere. In cases where multiple different default size spheres are supported, an indication as to what size sphere is to be used may be communicated to the playback device.

Image capture operations may be performed on an ongoing basis during an event, particularly with regard to each of the 3 sectors which can be captured by the camera rig 102.

Note that, while multiple camera views are captured corresponding to different sectors, the image capture rate need not be the same for all sectors. For example, a front facing sector corresponding to, e.g., the main playing field may capture images at a fast frame rate than the cameras corresponding to other sectors and/or the top (sky) and bottom (ground) views.

Figure 7:
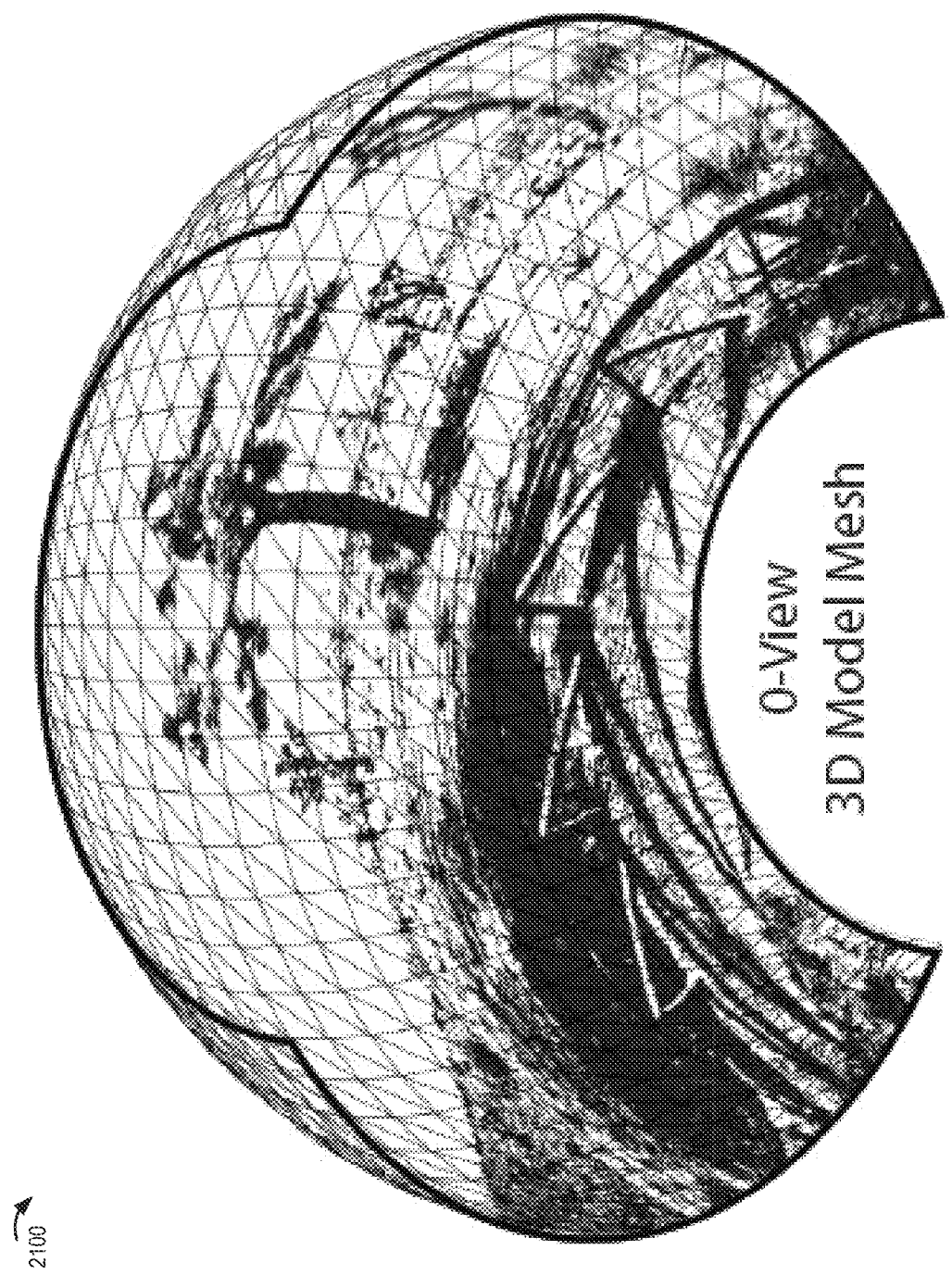
FIG. 7 shows an environmental mesh model corresponding to one sector of the camera rig with one of the images applied, e.g., projected, onto the environmental mesh to generate a background image.

FIG. 7 illustrates mapping of an image portion corresponding to a first sector to the corresponding 120-degree portion of the sphere representing the 3D viewing environment.

Images corresponding to different portions of the 360-degree environment are combined the extent needed to provide a contiguous viewing area to the viewer, e.g., depending on head position. For example, if the viewer is looking at the intersection of two 120-degree sectors, portions of the images corresponding to each sector may be stitched together and presented to the viewer based on the known angle and position of each image in the overall 3D environment being simulated. The image stitching and generation of an image will be performed for each of the left and right eye views so that two separate images are generated, one per eye, in the case of a stereoscopic implementation.

Figure 8:
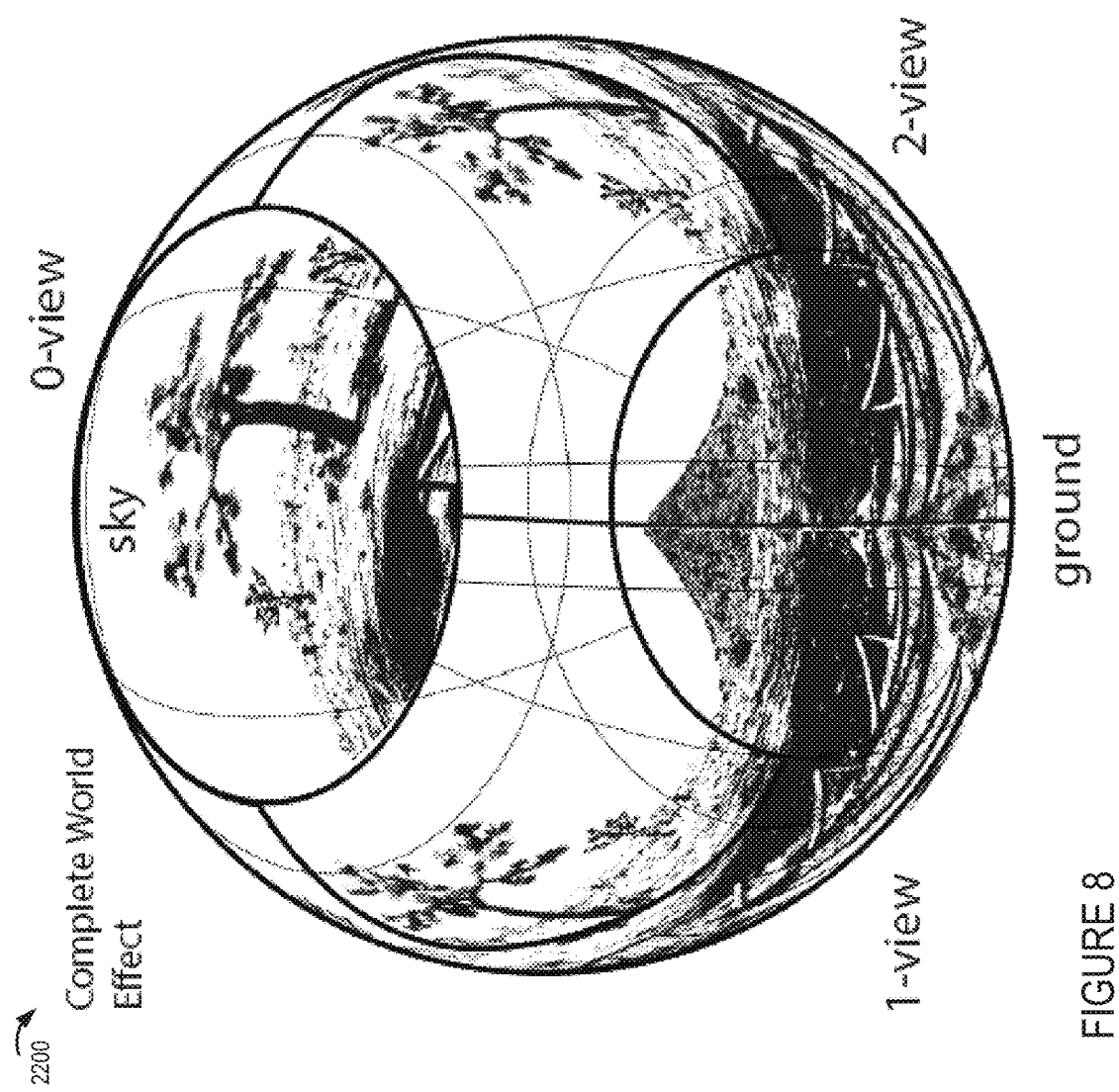
FIG. 8 shows application of images captured by cameras corresponding each of the sectors as well as the sky and ground cameras of the camera rig to simulate a complete 3D environment in the form of a sphere which can be used as a background to which foreground objects can be applied.

FIG. 8 shows how multiple decoded, corrected, and cropped images can be, and sometime are, mapped and stitched together to create a 360-degree viewing environment that can be used as a background to which foreground images of objects represented by point cloud data can be applied.

FIG. 9, which comprises the combination of FIGS. 9A, 9B, 9C and 9D, shows a method of processing, captured image content in accordance with this disclosure, which may be implemented by the content delivery system shown in FIG. 1 and/or the image processing, calibration and encoding device 112 of the content delivery system 104 shown in FIG. 1.

The method 400 shown in FIG. 9 starts in step 402, e.g., with the components, e.g., camera pairs, of the image capture system being powered on along with the components of 112, 114 of the content delivery system.

Operation proceeds in parallel to step 404 and 405. In step 404, a left eye image, e.g., left frame, is captured by a first camera of a stereoscopic camera pair and in step 406 a right eye image, e.g., frame is captured using a second camera of a stereoscopic camera pair. In some embodiments, both the first and second cameras use fish-eye lenses to capture images.

With the left and right frames of a stereoscopic camera pair having been captured in steps 404 and 406, operation proceeds along various paths where the captured images are processed. For example, operation proceeds from steps 404 and 406 to step 444 of FIG. 9C via connecting node A 407. Operation also proceeds from steps 404 and 406 to step 424 via connecting node B 408. Operation also proceeds from steps 404 and 406 to step 410.

The processing path corresponding to step 410 will now be described. In step 410, the left and right frames are processed and depth analysis is performed to determine a depth to which various pixels in the left and right eye images correspond. This depth is a distance that will be perceived by a viewer due to the difference between the left and right images. The depth of each pixel may be determined by any of a number of methods. In some embodiments, for example, the depth of each object may be determined by triangulating that object between each of the left eye camera and the right eye camera. In other embodiments, the camera rig 102 may include a light field camera that may be used to generate a depth map of the objects captured in the left and right frames.

With the depths to which individual pixels correspond having been determined, operation proceeds to step 412. In step 412, individual pixels in the left and right eye images are assigned to depth levels, e.g., with an individual pixel being assigned to one of a plurality of predetermined depth levels.

In step 414, pixels are grouped into blocks, e.g., rectangular sets of pixels. The size of the blocks may be 8 pixels by 8 pixels or some other size. Then, in step 416, the depth level of each block is determined based on the depth levels to which the pixels in the block correspond. In some embodiments, the depth level of the block is determined to be the depth level to which the majority of pixels in the block correspond. In other embodiments, each block may be determined to be the depth level of the pixel captured closest to the camera rig 102, the pixel captured farthest from the camera rig 102, etc.

With the depth levels of blocks in the left and right frames being known from step 416, operation proceeds to step 418 in which, for each depth level, a number of bits to use to represent each pixel is determined. In some embodiments, this step may involve accessing a look up table indicating numbers of bits to be used per pixel for different depths given a particular camera and/or lens configuration. The lookup table may reflect a known relationship between a listed depth and camera configuration and the ability of a user to distinguish between the quality of pixels captured using such a configuration where the pixel corresponds to an object at a given listed depth. The table provides a way to easily determine a good bit representation to be used and may be recomputed or determined using empirical testing of users and different numbers of bits for different depths using the listed camera/lens configuration. In other embodiments, the number of bits per pixel may be determined, based on the depth level of each block, using a formula. Again, the formula may be determined using empirical testing to determine the optimum relationship between the depth level of each block and the number of bits per pixel to be used for each block.

In step 420, the system 104, e.g., the image processing. calibration and encoding device 112, generates a bits per pixel encoding recommendation for each block of the left and right images, e.g., based on the determined depth of the blocks and bits per depth level information retrieved or otherwise determined in step 418. Operation then proceeds from step 420 to step 430 via connecting node C 422.

Referring now to step 424 shown in FIG. 9A, the left and right eye images are processed to identify objects and to determine, based on the variance within the individual left or right frame, a frame variance and/or an activity level indicating a difference between the left or right frame and a corresponding frame of a preceding or subsequent time period. Thus, by the end of step 424, the system has generated, on a per frame basis, information on the number and size of objects in the frame, the variance within the frame and/or the variance between the frame and another frame in a frame sequence being encoded. The information generated in step 424 is communicated to step 430 via connecting node D 426 and connecting node E 428. Additionally or alternatively, the number and size of objects and/or the variance may be determined on a per block basis.

In step 430, a determination is made as to the bits per pixel to be used for coding individual blocks of the left and right frames being processed. Step 420 may determine to use the recommended bits per pixel determined in step 420 or to modify this value based on object information about objects in a frame or pixel (such as size, location and/or number of objects) and/or activity level in a pixel block or frame (as indicated, for example, by variance of a frame and/or variance between the frame being processed and another frame).

Step 430 may include sub-steps 432, 434, 436 and 438. These sub-steps may be implemented on a per block of pixels basis with the decision in step 432 varying depending on the information relevant to a particular block that is used in the decision process.

In sub-step 432, a decision is made whether the number of bits per pixel for a block recommended in step 420 should be modified, e.g., because of the information supplied to sub-step 430. If, in sub-step 432, a determination is made to modify the bits per pixel, operation proceeds to sub-step 434 where the number of bits per pixel to be used is modified. In some instances, the number of bits per pixel may be increased for blocks depicting a larger number of objects and/or a large amount of activity. In this way, the chance of preserving information useful in conveying a sense of depth can be increased.

In sub-step 436, the bits per pixel to be used for the block being processed is set to the modified number set in sub-step 434. In sub-step 432, if no change is to be made to the recommended number of bits, operation proceeds to sub-step 438, in which the bits per pixel to be used for the block being processed is set to the number recommended in step 420. With the number of bits per pixel to be used for each block of the left and right frames having been set, e.g., on a per frame basis in step 430, operation proceeds to step 440 in which the determined number of bits per pixel to be used for encoding the individual blocks of the left and right frames is communicated to an encoder.

The processing associated with step 444 of FIG. 9C will now be discussed. In step 444, an angular mapping of a block position within the spherical domain is determined. The angular distance of an image portion from the center of the fish-eye lens is indicative of the amount of distortion that will have been introduced into that image portion by the fish-eye lens. In step 446, an expected amount of distortion introduced by the use of a fish-eye lens is determined based on the location of the image portion in the spherical domain. The amount of distortion introduced may be determined, based on the angular distance, using a look-up table or formula. In step 448, each image portion is assigned to an encoding complexity level based on the estimated amount of fish-eye distortion associated with that block. The encoding complexity level may be determined, based on the amount of distortion introduced or angular distance, using a look-up table or formula.

In step 450, a recommended prediction block size to be used for encoding each image portion of the frames being processed is determined based on the spatial encoding complexity level. Prediction blocks are used for intra-frame and/or inter-frame predictions during encoding. The prediction block size is the size of blocks that should be used for prediction purposes. Using larger prediction blocks encodes less information than if smaller prediction blocks are used. A prediction block may include one or more pixel blocks for which the bits per pixel number is determined. Accordingly, prediction blocks need not be the same size as the individual pixel blocks for which the number of bits per pixel is set. Prediction block sizes may be determined, based on the encoding complexity level (or amount of distortion introduced or angular distance), using a look-up table or formula.

Operation proceeds from step 450 to step 452 where a determination is made as to whether the prediction block size should be modified, e.g., due to the activity level or the size and/or number of objects in the portion of the frame for which the prediction block size is being determined. In some instances, the prediction block size may be reduced for image portions depicting a larger number of objects and/or a large amount of activity. If, in step 452, the decision is to modify the prediction block size for a portion of a frame to be encoded, operation proceeds to step 454 in which the prediction block size is modified, e.g., reduced in some instances and increased in other instances. Operation proceeds from step 454 to step 456 in which the prediction block size to be used is set to the modified block size of step 454. Operation then proceeds to step 460. If, in step 452, is it determined that the recommended prediction block size should not be changed, i.e., should be used, operation proceeds to step 458. In step 458, the prediction block size is set to the recommended block size and then operation proceeds to step 460. It should be appreciated that different portions of images may be assigned different prediction block sizes with steps 452 to steps 460 being performed for various portions of the left and right eye images to be encoded where the portions in some cases correspond to different depths.

In step 460, the prediction block size or sizes to be used for one or more portions of the left and right frames being processed is communicated to the encoder. For example, a first prediction block size may be determined to be used for portions of the frames close to a viewer and a second prediction block size maybe determined to be used for portions of frames corresponding to a depth further from the user. In some cases, the prediction block size for portions of the frames corresponding to a depth that is a second distance from the camera and/or viewer is larger than a prediction block size used for portions of the images corresponding to a first depth that is closer to the user than the second depth. Larger prediction blocks may be used for objects father from the camera because, in some cases, objects far from the user may be background objects that are less likely to change between frames. Additionally, larger prediction blocks may be used for objects father from the camera because blurriness in the distant images is less important in many cases from a quality perspective than blurriness in close up objects.

Operation proceeds from step 460 to step 464 via connecting node F 442. Prediction block size information is also received in step 464 via connecting node G 462 of FIG. 9C.

In step 464 an encoder is operated to encode the left and right frames of a stereoscopic pair using the number of bits per pixel and prediction block sizes determined in the preceding steps. The encoding may be performed by an encoder implemented in software executed by a processor or a dedicated hardware encoder. The output of step 464 is encoded left and right eye frames.

The encoded frames are stored, e.g., in memory and/or the content delivery system 114, in step 466. The encoded frames are transmitted in step 468 to a playback device 122, which then decodes and displays the frames in step 470.

It should be appreciated that the steps of the method 400 shown in FIG. 9 can be implemented repeatedly to process and encode a sequence of stereoscopic frame pairs to generate an encoded 3D video sequence including left and right eye image data for each frame pair of the stereoscopic image sequence.

Image encoders typically encode images in raster order (i.e., from the top-left corner of an image to the bottom-right corner of an image). Given enough time, an entire image frame may be encoded with the same amount of detail. However, when encoding and streaming images in real time or near real time, the process may be truncated and image information to be encoded later in the process may not be included in the encoded image. Accordingly, rather than encoding an image frame in raster order, the disclosed encoding device 112 may encode higher-priority information in an image frame before encoding lower-priority information.

As described above with reference to FIG. 9, the disclosed encoding device 112 determines a depth level of each block of pixels in step 416. Meanwhile, activity levels (and object information) are determined in step 424. Additionally, the angular position of image portions in the spherical domain are determined in step 444. Using the information characterizing each pixel block, the disclosed encoding device 112 may encode higher priority pixel blocks before encoding lower priority pixel blocks, ensuring that any truncation of the encoding process does not affect the amount of information encoded in higher priority blocks. For example, blocks of pixels captured closer to the camera rig 102 (as determined in step 416), which are to be rendered to appear closer to the viewer, may be encoded before pixel blocks captured farther from the camera rig 102. Within each group of pixel blocks in the same depth plane, the pixel blocks with more spatial activity or objects (as determined in step 424) may be encoded first. Additionally, pixel blocks nearer to the center of the fish-eye lens may be encoded before pixel blocks that are farther from the center of the fish-eye lens.

In some embodiments, pixel blocks may be rearranged into a custom stream and the custom stream may be encoded. In the custom stream, pixel blocks in the same depth plane from both the right eye image and the left eye image may be grouped together. The pixel blocks identified (in step 416) as being at the shallowest predetermined depth may appear first in the stream, followed by pixel blocks at the second shallowest predetermined depth, and so on. Within each group of pixel blocks, pixel blocks may be arranged according to the spatial activity (as determined in step 424), with pixel blocks depicting more motion or objects appearing first in the stream. The location of pixel blocks within the custom stream may also be determined based on the angular position of the pixel block in the spherical domain (as determined in step 444). Accordingly, pixel blocks nearer to the center of the fish-eye lens may appear in the custom stream before pixel blocks that are farther from the center of the fish-eye lens. By rearranging the pixel blocks into a custom stream and encoding the custom stream, higher priority blocks (that are captured closer to the camera rig 102, that include more movement or objects, or that are closer to the center of the fish-eye lens) are encoded before lower priority pixel blocks (that are captured farther from the camera rig 102, that include less movement or objects, or that are farther from the center of the fish-eye lens).

Rearranging pixel blocks into a custom stream and encoding the custom stream provides a number of benefits. Grouping pixel blocks in the same depth plane reduces overhead by reducing the amount of depth information needed for the decoding apparatus 122 to determine the depth level of the individual pixel blocks. When mapping the 2D-encoded frame to the 3D spherical dimension, the decoding apparatus 122 can determine the depth of each pixel block in the 2D-encoded frame by starting with pixel blocks that appear closest to the viewer and then moving to each successive predetermined depth level. Arranging pixel blocks in the same depth plane by spatial activity also increases the intra-spatial prediction efficiency and temporal motion vector predictor reuse.

On the other hand, rearranging the pixel blocks into a custom stream and encoding the custom stream has a number of drawbacks. First and foremost, the decoding apparatus 122 that decodes and renders pixel blocks that have been rearranged needs to be configured to spatially reassemble the pixel blocks so they appear in the same position that they were captured. Additionally, the encoder 122 is unable to predict and estimate motion across adjacent pixel blocks. Accordingly, in some embodiments, the encoding device 112 encodes higher priority blocks (that are captured closer to the camera rig 102, that include more movement, and that are closer to the center of the fish-eye lens) before encoding lower priority pixel blocks (that are captured farther from the camera rig 102, that include less movement, and that are farther from the center of the fish-eye lens) without rearranging those pixel blocks into a custom stream.

While steps are shown in an exemplary order it should be appreciated that in many cases the order of the steps may be altered without adversely affecting operation. Accordingly, unless the exemplary order of steps is required for proper operation, the order of steps is to be considered exemplary and not limiting.

Some embodiments are directed a non-transitory computer readable medium embodying a set of software instructions, e.g., computer executable instructions, for controlling a computer or other device to encode and compresses stereoscopic video. Other embodiments are embodiments are directed a computer readable medium embodying a set of software instructions, e.g., computer executable instructions, for controlling a computer or other device to decode and decompresses video on the player end. While encoding and compression are mentioned as possible separate operations, it should be appreciated that encoding may be used to perform compression and thus encoding may, in some include compression. Similarly, decoding may involve decompression.

The techniques of various embodiments may be implemented using software, hardware and/or a combination of software and hardware. Various embodiments are directed to apparatus, e.g., a image data processing system. Various embodiments are also directed to methods, e.g., a method of processing image data. Various embodiments are also directed to a non-transitory machine, e.g., computer, readable medium, e.g., ROM, RAM, CDs, hard discs, etc., which include machine readable instructions for controlling a machine to implement one or more steps of a method.

Various features of the present disclosure are implemented using modules. Such modules may, and in some embodiments are, implemented as software modules. In other embodiments the modules are implemented in hardware. In still other embodiments the modules are implemented using a combination of software and hardware. In some embodiments the modules are implemented as individual circuits with each module being implemented as a circuit for performing the function to which the module corresponds. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present disclosure. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present disclosure is directed to a machine-readable medium including machine executable instructions for causing a machine, e.g., processor and associated hardware, to perform one or more of the steps of the above-described method(s).

Numerous additional variations on the methods and apparatus of the various embodiments described above will be apparent to those skilled in the art in view of the above description. Such variations are to be considered within the scope.

What is claimed is:

1. A method, comprising:
   receiving a left frame and a right frame of a stereoscopic image pair;
   grouping pixels from the left frame and the right frame into pixel blocks;
   determining an angular distance of each pixel block relative to the center of the left frame or the right frame;
   identifying an amount of variance in the left frame or the right frame;
   selecting a number of bits per pixel to encode each pixel block based at least in part on the angular distance of each pixel block; and
   modifying the number of bits per pixel based at least in part on the amount of variance identified.

2. The method of claim 1, wherein the determined angular distance of each pixel block is indicative of an angular distance from a portion of a fish-eye lens used to capture the pixel block to the center of the fish-eye lens.

3. The method of claim 1, further comprising:
   determining an angular distance of an image portion of the left frame or the right frame relative to the center of the left frame or the right frame; and
   selecting a prediction block size for encoding the image portion based at least in part on the angular distance of the image portion.

4. The method of claim 3, wherein the prediction block size is selected based on the angular distance of the image portion and at least one of a size of an object depicted in the image portion, a size of an object depicted in the left frame and the right frame, a number of objects depicted in the image portion, a number of objects depicted in the left frame and the right frame, the amount of variance between the left frame and the right frame, an activity level in the image portion, or an amount of variance in successive image frames.

5. The method of claim 3, further comprising:
encoding the stereoscopic image pair to form an encoded stereoscopic image pair by:
encoding each pixel block using the number of bits selected for each pixel block; and
encoding the image portion using the selected prediction block size.

6. The method of claim 5, further comprising:
outputting the encoded stereoscopic image to a communications network for transmittal to a playback device.

7. The method of claim 1, further comprising:
determining a representative depth of each pixel block based on the depths of the pixels in each pixel block,
wherein the selected number of bits per pixel to encode each pixel block is further based on the representative depth of each pixel block.

8. The method of claim 1, further comprising:
identifying a number of objects depicted in each pixel block or depicted in the left frame and the right frame,
wherein the selected number of bits per pixel to encode each pixel block is further based on the identified number of objects.

9. The method of claim 1, further comprising:
receiving successive stereoscopic image pairs; and
identifying the amount of variance in the successive stereoscopic image pairs,
wherein the selected number of bits per pixel to encode each pixel block is further based on the identified amount of variance.

10. A content delivery system, comprising:
a network interface for receiving a left frame and a right frame of a stereoscopic image pair;
one or more encoders; and
a processor configured to:
group pixels from the left frame and the right frame into pixel blocks;
determine an angular distance of each pixel block relative to the center of the left frame or the right frame;
identify an amount of variance in the left frame or the right frame;
select a number of bits per pixel to encode each pixel block based at least in part on the angular distance of each pixel block; and
modifying the number of bits per pixel based at least in part on the amount of variance identified.

11. The system of claim 10, wherein the determined angular distance of each pixel block is indicative of an angular distance from a portion of a fish-eye lens used to capture the pixel block to the center of the fish-eye lens.

12. The system of claim 10, wherein the processor is further configured to:
determine an angular distance of an image portion of the left frame or the right frame relative to the center of the left frame or the right frame; and
select a prediction block size for encoding the image portion based at least in part on the angular distance of the image portion.

13. The system of claim 12, wherein the prediction block size is selected based on the angular distance of the image portion and at least one of a size of an object depicted in the image portion, a size of an object depicted in the left frame and the right frame, a number of objects depicted in the image portion, a number of objects depicted in the left frame and the right frame, the amount of variance between the left frame and the right frame, an activity level in the image portion, or an amount of variance in successive image frames.

14. The system of claim 12, wherein:
the one or more encoders are configured to encode the stereoscopic image pair by:
encoding each pixel block using the number of bits selected for each pixel block; and
encoding the image portion using the selected prediction block size; and
the processor is further configured to output the encoded stereoscopic image to a communications network for transmittal to a playback device.

15. The system of claim 10, wherein the processor is further configured to:
determine a representative depth of each pixel block based on the depths of the pixels in each pixel block,
wherein the selected number of bits per pixel to encode each pixel block is further based on the representative depth of each pixel block.

16. The system of claim 10, wherein the processor is further configured to:
identify a number of objects depicted in each pixel block or depicted in the left frame and the right frame,
wherein the selected number of bits per pixel to encode each pixel block is further based on the identified number of objects.

17. The system of claim 10, wherein the processor is further configured to:
receive successive stereoscopic image pairs; and
identify the amount of variance in the successive stereoscopic image pairs,
wherein the selected number of bits per pixel to encode each pixel block is further based on the identified amount of variance.

18. A non-transitory computer readable storage medium storing processor-executable instructions that, when executed by a processor of a content delivery system, cause the content delivery system to:
receive a left frame and a right frame of a stereoscopic image pair;
group pixels from the left frame and the right frame into pixel blocks;
determine an angular distance of each pixel block relative to the center of the left frame or the right frame; and
identify an amount of variance in the left frame or the right frame;
select a number of bits per pixel to encode each pixel block based at least in part on the angular distance of each pixel block;
modifying the number of bits per pixel based at least in part on the amount of variance identified.

* * * * *